United States Patent
Frank et al.

(10) Patent No.: US 8,153,697 B2
(45) Date of Patent: Apr. 10, 2012

(54) ANTIFOAMING AGENT FOR AQUEOUS MEDIA

(75) Inventors: Albert Frank, Xanten (DE); Daniela Leutfeld, Wesel (DE); Dinah Grawe, Ratingen (DE); Michaela Michelbrink, Rees (DE)

(73) Assignee: BYK-Chemie GmbH (DE)

( * ) Notice: Subject to any disclaimer, the term of this patent is extended or adjusted under 35 U.S.C. 154(b) by 89 days.

(21) Appl. No.: 12/517,629

(22) PCT Filed: Dec. 3, 2007

(86) PCT No.: PCT/EP2007/010488
§ 371 (c)(1),
(2), (4) Date: Dec. 18, 2009

(87) PCT Pub. No.: WO2008/067974
PCT Pub. Date: Jun. 12, 2008

(65) Prior Publication Data
US 2010/0096583 A1    Apr. 22, 2010

(51) Int. Cl.
*B01D 19/04*    (2006.01)
*C09D 7/12*    (2006.01)

(52) U.S. Cl. ...... 516/123; 516/131; 252/78.1; 252/78.3; 106/31.13; 524/227

(58) Field of Classification Search .......... 516/123, 516/131; 252/78.1, 78.3; 524/227; 106/31.13
See application file for complete search history.

(56) References Cited

U.S. PATENT DOCUMENTS 5,994,494 A * 11/1999 Wakui .............. 528/332
2003/0232961 A1   12/2003 Manias et al.

FOREIGN PATENT DOCUMENTS

| EP | 0877063 | | 11/1998 |
|---|---|---|---|
| GB | 1207620 | * | 10/1970 |
| GB | 2203425 | | 10/1988 |

OTHER PUBLICATIONS

"International Application Ser. No. PCT/EP2007/010488, International Preliminary Report on Patentability", (Jul. 16, 2009), 8 pgs.

* cited by examiner

*Primary Examiner* — Ling Choi
*Assistant Examiner* — Chun-Cheng Wang
(74) *Attorney, Agent, or Firm* — Schwegman, Lundberg & Woessner, P.A.

(57) ABSTRACT

The invention relates to the use of a polyamide prepared from at least one diamine and at least one dicarboxylic acid in a formulation for defoaming aqueous media. The invention also relates to defoamers for aqueous media that comprise such a polyamide.

35 Claims, No Drawings

ANTIFOAMING AGENT FOR AQUEOUS MEDIA

RELATED APPLICATIONS

This application is a national stage application under 35 U.S.C. §371 of PCT/EP2007/010488, filed Dec. 3, 2007, and published as WO 2008/067975 A2 on Jun. 12, 2008, which claims priority under 35 U.S.C. §119 to German Application No. 10 2006 057 373.0, filed Dec. 4, 2006, which applications and publication are incorporated herein by reference and made a part hereof in their entirety.

The invention relates to defoamers for aqueous media that comprise certain polyamides as a hydrophobic component critically influencing the defoaming. They may acquire the properties necessary for their particular activity as defoamers through precipitation from a solution and/or through introduction into a carrier medium.

In numerous industrial processes taking place, in particular, in aqueous media, such as in the manufacture of inks and paints, in wastewater treatment, in papermaking, in the textile industry and in emulsion polymerization, for example, it is necessary to suppress or do away entirely with the unwanted formation of foam during the preparation or processing operations. This can be achieved by adding what are known as antifoams or defoamers, which are capable, even at very low concentrations above about 0.001% by weight, of preventing or destroying unwanted foams. The prior art has disclosed a multiplicity of defoamers, such as silicone oils, mineral oils, hydrophobic polyoxyalkylenes, long-chain alcohols and also mixtures of these products with one another and emulsions thereof, for example. The activity is frequently boosted by adding what are called hydrophobic solids in amounts of 0.1% to 10% by weight, which specifically promote dewetting processes on foam lamellae and therefore very actively assist in foam collapse. Suitable hydrophilic solids of the prior art are corresponding silicas, metal stearates, polyolefins and waxes, or ureas and urea derivatives.

From German patent DE 855 688 it is known that fatty acid amides can be used as hydrophobic solids in defoamers. A description is given of reacting, for this purpose, diamines with specific monocarboxylic acids selected from the fatty acids series. This produces water-insoluble solids which for further use are necessarily employed in a mixture with a non-aqueous solvent, such as low-boiling mineral spirits, for example. Use without the addition of the non-aqueous solvent proves completely ineffective in the context of foam prevention in aqueous media. A mixture with oils of relatively high viscosity is likewise described as disadvantageous.

The U.S. Pat. Nos. 3,677,963 and 3,652,453 describe methods of employing the fatty acid amides already known from DE 855 688, the fatty acid amides being brought into a finely disperse form by means of a shock cooling operation.

Another process for preparing finely disperse forms of the known fatty acid amides is to heat the fatty acid amides to dissolution temperature in the organic liquid and thereafter to cool the solution rapidly, with vigorous stirring and shaking, whereupon the fatty acid amide is deposited in the form of a fine dispersion. Disadvantages of this process include the high energy costs occasioned by the heating of the organic phases. Furthermore, the solid fatty acid amide can also be brought to the required fineness by milling in an arbitrary mill.

A disadvantage associated with all of the existing defoamer systems made up of hydrophobic solids and a carrier medium is the rapid settling of the dispersed solids from the carrier medium. This occurs to an increased extent with the above-mentioned fatty acid amides prepared from diamines and specific monocarboxylic acids selected from the fatty acids series. As a result, the storage stability is lowered considerably. Moreover, the stated systems have the disadvantage that they necessarily require the use of a non-aqueous solvent, such as low-boiling mineral spirits or the like. The use of such solvents, however, is no longer current, against the background of more stringent limits and environmental impositions.

It is an objective of the invention, therefore, to provide a highly universal defoamer with hydrophobic solid that offers a high degree of reliability in respect of the defoaming of a very wide variety of aqueous systems, and does so with minimal technical complexity. This defoamer ought to be compatible with carrier systems which satisfy the modern-day requirements of occupational hygiene and the environmental impositions. Moreover, it ought to be distinguished by high stability on storage even at an elevated temperature.

Surprisingly it has emerged that defoamer formulations comprising polyamides prepared from at least one dicarboxylic acid and at least one diamine as hydrophobic solids have excellent defoaming properties in aqueous media.

Owing to the preferably linear polymer structure of the polyamides, they exhibit improved activity in defoamer formulations as compared with the known polyamides. Moreover, the solubility and the compatibility with the carrier media can be adjusted, through the possibility of specific further reaction of free functionalities with monoamines and/or monocarboxylic acids, in such a way as to achieve a considerable increase in defoamer activity in tandem with optimization of the processing capacities. In this way it is possible, in addition, to achieve a very good storage stability.

The polyamides can be obtained by polycondensation of long-chain dicarboxylic acids, more particularly those known as dimer fatty acids, with diamines.

Used with particular preference as dicarboxylic acids are so-called dimer fatty acids, which are prepared by dimerizing unsaturated fatty acids. In downstream operating steps the resulting dimers can be purified by distillation and/or hydrogenation. This removes impurities represented by monomeric fatty acids and/or trimerized fatty acid. Through hydrogenation it is also possible to achieve a marked improvement in the dark colour of the dimer fatty acids.

As diamines it is possible with preference to use diamines having a chain length of C4-C36. Diamines whose chain is interrupted by heteroatoms, such as 4,9-dioxa-1,12-dodecanediamine and α,ω-diaminopolypropylene glycol, for example, can also be used. With particular preference the diamines are hexamethylenediamine and diaminododecane.

The dicarboxylic acid component is preferably used in a molar ratio of 1:2 to 2:1 relative to the diamine. Where the difunctional components are not used in equimolar amounts, the polyamide may further contain groups of at least one monoamine and/or of at least one monocarboxylic acid, which can be added to the reaction mixture. Preferably this likewise produces an equimolar ratio of the acid and amine functionalities.

Monocarboxylic acids which can be used include all chain lengths of C10-C40, preferably of C16-C26, more preferably of C18-C22. These monocarboxylic acids may also be mono- or polyunsaturated. Additionally it is possible to use monocarboxylic acids of natural origin as well. These monocarboxylic acids of natural origin are often mixtures of monocarboxylic acids differing in chain length, and also differ in the number of double bonds. Possible examples include capric acid, lauric acid, myristic acid, palmitic acid, stearic acid, arachidic acid, behenic acid, lignoceric acid, cerotic acid, myristoleic acid, palmitoleic acid, oleic acid, elaidic acid, eicosenoic acid, erucic acid, ricinoleic acid, linoleic acid, linolenic acid, arachidonic acid, timnodonic acid and clupanodonic acid. Mixtures of two or more fatty acids can also be used. They can be mixed before the reaction or added separately to the reaction.

In one preferred embodiment the molar ratio of dicarboxylic acid to monocarboxylic acid is 0.5-1, more preferably 0.5-0.8 and with particular preference 0.5-0.7.

The molar ratio of diamine to monocarboxylic acid is then preferably 1-5, more preferably 1-3 and with particular preference 1-1.5.

Monoamines which can be used are saturated or mono- or polyunsaturated primary or secondary amines having a chain length of C10-C40, preferably of C12-C30, more preferably of C14-C24. With preference it is possible to use tallowamines, hydrogenated or unhydrogenated, stearylamine, cocoamine, and alkylamines having a chain length of C16-C22. Secondary amines used with preference are distearylamine, ditallowamines and dipalmitylamine.

In a further preferred embodiment the molar ratio of diamine to monoamine is 0.5-4, more preferably 0.5-2 and with particular preference 0.5-1.

The molar ratio of dicarboxylic acid to monoamine is then preferably 1-5, more preferably 1-3 and with particular preference 1-1.5.

Generally speaking, free reactive groups still available after the condensation can be reacted further. Reactive groups may be still available if the reaction has not taken place to completion, or if the amines or the carboxylic acids are employed in excess. Free acid groups can be converted into salt form using amines, for example. Free amino groups can be reacted, for example, with isocyanates, or are added to acrylic ester in a Michael addition. These modifications allow the polarity of the polyamide chains to be further adapted to the requirements of the carrier medium or of the paint system in which defoaming is to take place.

The processes of polycondensation are known to a person of ordinary skill in the art. To remove the water of reaction, it is possible on the one hand to operate with an azeotrope former, such as toluene or xylene, for example; alternatively, operation takes place without solvent, and water of reaction formed is expelled by introduction of nitrogen or by application of vacuum.

The weight-average molecular weight of the polycondensates is between 1000 and 10 000, preferably between 1500 and 7000, and more preferably between 2000 and 4000.

The resulting product is waxy or solid. Correspondingly, the polycondensate can be melted prior to further processing, and then added to the carrier medium. Alternatively the polycondensate can also be taken up in solvents or else in other liquid additives used in the formulation of defoamers. With particular preference the polycondensate will be taken up in emulsifiers, since these are added in any case to the majority of defoamer formulations.

Together with these emulsifiers the polycondensate forms gels. The gels are ideally clear and in that case are particularly easy to melt and incorporate into the different carrier media.

The polycondensates, or the mixtures of the polycondensates and the emulsifiers, or the mixtures of the polycondensates with solvent or other liquid additives, are then added in the liquid state to the carrier medium.

Where the polycondensates, or the mixtures of the polycondensates and the emulsifiers, or the mixtures of the polycondensates with solvents or other liquid additives, are solid, they are heated beyond their melting point prior to use and then are added in the liquid state to the carrier medium.

Suitable carrier media include not only organic and mineral oils but also siloxanes or organically modified siloxanes.

The addition of emulsifiers allows defoamer formulations of this kind to be converted into aqueous emulsions as well.

The defoamers of the invention can be used, for example, for defoaming paints and printing inks, polymer dispersions and cooling lubricants.

The examples which follow illustrate the invention without imposing any restriction on it.

EXAMPLES

Preparation Examples for the Polycondensates

Example 1

A 250 ml three-neck flask with stirrer, thermometer, water separator, reflux condenser, dropping funnel and nitrogen connection is charged at room temperature with 67.30 g of Pripol 1006, 67.3 g of tall oil fatty acid and 30 g of xylene. Under a nitrogen atmosphere this initial charge is heated to 80° C. After it has reached this temperature, 37.14 g of hexamethylenediamine (70% in water) are added over the course of 2 minutes. In the course of the exothermic reaction which then commences, the temperature rises to 100° C. The temperature is then increased gradually to approximately 160° C., and until there is xylene reflux. The reaction mixture is stirred at approximately 160° C. for two hours, before the temperature is raised to 180° C. for three hours in order to complete the reaction. At the end of this time it is no longer possible to observe any water of reaction being given off. A clear orange gel is obtained.

Example 2

A 250 ml three-neck flask with stirrer, thermometer, water separator, reflux condenser, dropping funnel and nitrogen connection is charged at room temperature with 44.51 g of Pripol 1022, 30.85 g of lauric acid and 25 g of xylene. Under a nitrogen atmosphere this initial charge is heated to 70° C. After it has reached this temperature, 24.64 g of hexamethylenediamine (70% in water) are added over the course of 10 minutes. In the course of the exothermic reaction which then commences, the temperature rises to 97° C. The temperature is subsequently raised to 160° C.-170° C. until there is xylene reflux. After a reaction time of four hours approximately 9.0 g of water have been given off. A clear brown gel is obtained.

Example 3

A 250 ml three-neck flask with stirrer, thermometer, water separator, reflux condenser, dropping funnel and nitrogen connection is charged at room temperature with 36.60 g of Pripol 1006, 43.14 g of behenic acid and 25 g of xylene. Under a nitrogen atmosphere this initial charge is heated to 70° C. After it has reached this temperature, 20.26 g of hexamethylenediamine (700 in water) are added over the course of 6 minutes. The temperature is then raised to approximately 160° C.; at this temperature, xylene reflux commences. After a reaction time of four hours approximately 8.4 g of water have been given off. A clear orange gel is obtained.

Example 4

A 250 ml three-neck flask with stirrer, thermometer, water separator, reflux condenser, dropping funnel and nitrogen connection is charged at room temperature with 18.52 g of sebacic acid, 52.18 g of oleic acid, 20.51 g of hexamethylenediamine and 0.1 g of p-toluenesulphonic acid. Under a nitrogen atmosphere the reaction mixture is slowly melted and the temperature is raised to 180° C. The water of reaction formed is removed by means of a gentle stream of nitrogen. The reaction mixture is held under these conditions for 5 hours. At the end of this time it is no longer possible by IR spectroscopy to determine any carboxylic acid. A clear orange gel is obtained.

Example 5

A 250 ml three-neck flask with stirrer, thermometer, water separator, reflux condenser, dropping funnel and nitrogen connection is charged at room temperature with 35.94 g of Pripol 1006, 35.45 g of lauric acid and 25 g of xylene. Under a nitrogen atmosphere this initial charge is heated to 70° C. After it has reached this temperature, 28.61 g of hexamethylenediamine (70% in water) are added over the course of 10 minutes. The temperature is then raised to 170° C. until xylene reflux is obtained. After a reaction time of four hours water is no longer given off. A viscous orange liquid is obtained.

Example 6

A 250 ml three-neck flask with stirrer, thermometer, water separator, reflux condenser, dropping funnel and nitrogen connection is charged at room temperature with 37.32 g of Pripol 1006, 36.80 g of tall oil fatty acid and 25 g of xylene. Under a nitrogen atmosphere this initial charge is heated to 70° C. After it has reached this temperature, 25.88 g of diaminododecane are added over the course of 10 minutes. The temperature is then raised to 170° C. until xylene reflux is obtained. After a reaction time of four hours water is no longer given off. A viscous orange liquid is obtained.

Pripol 1006=purified and hydrogenated dimer acid based on linoleic acid, Uniqema, Gouda, NL Pripol 1022=dimer acid based on linoleic acid, Uniqema, Gouda, NL Preparation Examples for the Particle Concentrates

Example 7

100 g of polycondensate from Example 1 are introduced into a 250 ml evaporating flask. At an oil bath temperature of 180° C., using a rotary evaporator and applying a vacuum of <20 mbar, all of the volatile constituents are distilled off in 60 minutes. 32.66 g of the resulting polycondensate are then dissolved at a temperature of approximately 75-85° C. in 67.34 g of sorbitan monooleate. A clear orange gel is obtained.

Example 8

100 g of polycondensate from Example 3 are introduced into a 250 ml evaporating flask. At an oil bath temperature of 180° C., using a rotary evaporator and applying a vacuum of <20 mbar, all of the volatile constituents are distilled off in 60 minutes. 32.66 g of the resulting polycondensate are then dissolved at a temperature of approximately 80-85° C. in 67.34 g of sorbitan monooleate. A clear orange gel is obtained.

Example 9

32.66 g of the polycondensate from Example 4 are dissolved at a temperature of approximately 90-105° C. in 67.34 g of sorbitan monooleate. A slightly cloudy orange gel is obtained.

Performance Tests:

Performance testing of the inventive polyamide particles in a mineral oil defoamer formulation:

Test 1:

95% of Shell Ondina 941 (white mineral oil, Shell, Hamburg, Del.) are mixed with 5% of sorbitan monooleate.

Test 2:

92.5 g of Shell Ondina 941 are charged to a 350 ml PE beaker. Accompanied by shearing using a Dispermat CV (4 cm toothed disc) at 2000 rpm, 7.5 g of the melted mixture from Example 9 are added and dispersion takes place at 4000 rpm for three minutes.

Test 3:

As Test 2, but with the polyamide from Example 7.

Test 4:

As Test 2, but with the polyamide from Example 8.

Tests 2-4 describe inventive defoamer formulations.

Test 5:

92.5 g of Shell Ondina 941 and 5 g of sorbitan monooleate are homogenized in a 350 ml PE beaker. Accompanied by shearing using a Dispermat CV (4 cm toothed disc) at 1000 rpm, 2.5 g of micronized EBS wax ($d_{50}$=4 μm) are added and dispersion takes place at 4000 rpm for three minutes.

EBS/wax/mineral oil melt: 3 parts of Shell Ondina 941 are homogenized with 1 part of EBS wax at approximately 140° C.

Test 6:

90 g of Shell Ondina 941 and 5 g of sorbitan monooleate are charged to a 350 ml PE beaker. Accompanied by shearing using a Dispermat CV (4 cm toothed disc) at 2000 rpm, 10 g of the EBS/wax/mineral oil melt are added and dispersion takes place at 4000 rpm for three minutes.

Test 7:

As Test 6, but the EBS/wax/mineral oil melt is incorporated by means of a paddle stirrer at 1000 rpm and dispersed for three minutes.

Test 8:

92.5 g of Shell Ondina and 5 g of sorbitan monooleate and 2.5 g of EBS wax are charged to a 250 ml steel vessel and homogenized by heating to approximately 140° C. Thereafter, under shearing at 4000 rpm (Dispermat CV (4 cm toothed disc)) the mixture is cooled to below the melting point of the EBS wax and then cooled with relatively low shearing to a temperature <50° C.

Test 9:

As Test 8, but shearing during the cooling phase is carried out only with a paddle stirrer at 1000 rpm.

EBS wax=1,2-ethylenebis(stearamide)

The defoamer formulations from Tests 1-9 are investigated for their defoaming activity in an emulsion paint based on Acronal 290 D.

Test system: emulsion paint based on Acronal 290 D

Formulation (in %):

| | | | |
|---|---|---|---|
| 1. | Water | 3.50 | |
| 2. | Calgon N 10% in water | 1.45 | BK Guilini Chemie, Ladenburg, DE |
| 3. | Collacral VAL | 4.80 | BASF, Ludwigshafen, DE |
| 4. | Emulan OC 20% in water | 2.40 | BASF, Ludwigshafen, DE |

-continued

| | | | |
|---|---|---|---|
| 5. | Ammonia, 25% form | 1.00 | |
| 6. | Parmetol A 26 | 0.30 | Schülke & Mayr, Norderstedt, DE |
| 7. | Kronos 2059 | 24.00 | Kronos Titan, Leverkusen, DE |
| 8. | White spirit K30 | 0.25 | |
| 9. | Butyl glycol | 2.90 | |
| 10. | Acronal 290 D | 48.00 | BASF, Ludwigshafen, DE |
| 11. | Water | 11.40 | |
| | | 100.00 | |

Preparation Instructions:

Mix items 1-6, add item 7 with stirring and disperse for 20 min (dispersing 20 min 9.8 m/s=1865 rpm d=10 cm).

Mix items 8 and 9 and add with stirring. Add items 10 and 11 with stirring. Stir the whole for a further 15 min at 930 rpm.

Incorporation and Testing of the Defoamer:

50 g of emulsion paint are weighed out into a 175 ml PE beaker and 0.5% of the test defoamer is added.

Incorporation: dissolver, toothed disc d=4 cm, 2 min at 1865 rpm=4 m/s

The sample is stored at room temperature for 16-24 hours prior to application.

Thereafter 30 g of the sample are applied using an open-pored foam roller to a contrast chart (coated, No. 2801, BYK-Gardner, size approximately 28 cm×21 cm). The foam roller (5.5 cm wide, d=8 cm, with handle, No. 3918730 from Friess) is washed out with water prior to each test, then wrung out and rolled dry as thoroughly as possible on a towel.

Results of Testing:

| | Description | Defoaming |
|---|---|---|
| Test 1 | Defoamer without particles | 5 |
| Test 2 | Defoamer with polyamide particles from Example 9 | 0-1 |
| Test 3 | Defoamer with polyamide particles from Example 7 | 1 |
| Test 4 | Defoamer with polyamide particles from Example 8 | 0-1 |
| Test 5 | Defoamer with micronized EBS wax, $d_{50}$ = 4 µm | 4 |
| Test 6 | Defoamer with EBS wax after quick-chill operation, dispersed | 3 |
| Test 7 | Defoamer with EBS wax after quick-chill operation, stirred | 4 |
| Test 8 | Defoamer with EBS wax after melting operation, dispersed | 4-5 |
| Test 9 | Defoamer with EBS wax after melting operation, stirred | 4-5 |

Evaluation:
0 = complete defoaming
5 = no defoaming activity

The defoamer formulations comprising the polyamide particles of the invention are distinguished by very good stability on storage.

Performance testing of the inventive polyamide particles in a polyglycol defoamer formulation Test 10:

93.8 g of Polyglycol P 4000 (Dow Chemical, Midland, US) are mixed with 6.2 g of sorbitan monooleate.

Test 11:

2.5 parts of the polyamide from Example 4 are homogenized with 5 parts of sorbitan monooleate with heating to approximately 100° C. 90.8 g of Polyglycol P 4000 are charged to a 350 ml PE beaker. With shearing using a Dispermat CV (4 cm toothed disc), 9.2 g of the mixture of polyamide and sorbitan monooleate are added at 3000 rpm and dispersed at 4000 rpm for three minutes.

Test 12:

As Test 11, but with the polyamide from Example 1

Test 13:

As Test 11, but with the polyamide from Example 3

Tests 11-13 describe inventive defoamer formulations.

Test 14:

93.8 g of Polyglycol P 4000 and 6.13 g of sorbitan monooleate are homogenized in a 350 ml PE beaker. Accompanied by shearing using a Dispermat CV (4 cm toothed disc) at 1000 rpm, 3.07 g of micronized EBS wax ($d_{50}$=4 µm) are added and dispersion takes place at 4000 rpm for three minutes.

The defoamer formulations from Tests 10-14 are investigated for their defoaming activity in an emulsion paint based on Mowilith DM 611.

Test system: emulsion paint based on Mowilith DM 611

Formulation (in %):

| | | | |
|---|---|---|---|
| 1. | Water | 17.70 | |
| 2. | Calgon N 10% in water | 2.00 | BK Giulini Chemie, Ladenburg, DE |
| 3. | Ammonia, 32% form | 0.30 | |
| 4. | Parmetol A 26 | 0.20 | Schülke & Mayr, Norderstedt, DE |
| 5. | BYK-154 | 0.80 | BYK Chemie, Wesel, DE |
| 6. | Natrasol 250 HHR | 0.20 | Hercules, Wilmington, US |
| 7. | Titanium dioxide RHD-2 | 20.00 | |
| 8. | Finntalk M 15 | 6.00 | Omya, Cologne, DE |
| 9. | Durcal 5 | 17.00 | Omya, Cologne, DE |
| 10. | Socal P2 | 4.00 | Solvay, Brussels, BE |
| 11. | Mowilith DM 611 | 29.50 | Celanese, Dallas, US |
| 12. | Viscalex HV 30 | 0.30 | Ciba, Basle, CH |
| 13. | White spirit | 1.30 | |
| 14. | Texanol | 0.70 | |
| | | 100.00 | |

Preparation Instructions:

Mix items 1-5, add item 6 with stirring and stir for 10-15 min until the Natrosol has dissolved. Mix items 7-10 and add with stirring.

Dispersion: 15 min 3730 rpm. Add item 11 with stirring, add item 12, mix items 13 and 14 and add with stirring. Stir the whole for a further 5 min at 930 rpm.

Incorporation and Testing of the Defoamer:

50 g of emulsion paint are weighed out into a 175 ml PE beaker and 0.5 of the test defoamer is added.

Incorporation: dissolver, toothed disc d=4 cm, 2 min at 1865 rpm=4 m/s

The sample is stored at room temperature for 16-24 hours prior to application.

Thereafter 30 g of the sample are applied using an open-pored foam roller to a contrast chart (coated, No. 2801, BYK-Gardner, size approximately 28 cm×21 cm). The foam roller (5.5 cm wide, d=8 cm, with handle, No. 3918730 from Friess) is washed out with water prior to each test, then wrung out and rolled dry as thoroughly as possible on a towel.

Results of Testing:

| | Description | Defoaming |
|---|---|---|
| Test 10 | Defoamer without particles | 5 |
| Test 11 | Defoamer with polyamide particles from | 1-2 |

-continued

| | Description | Defoaming |
|---|---|---|
| | Example 4 | |
| Test 12 | Defoamer with polyamide particles from Example 1 | 2 |
| Test 13 | Defoamer with polyamide particles from Example 3 | 2 |
| Test 14 | Defoamer with micronized EBS wax, $d_{50}$ = 4 μm | 5 |

Evaluation:
0 = complete defoaming
5 = no defoaming activity

The defoamer formulations comprising the polyamide particles of the invention are distinguished by very good stability on storage. The defoamer formulations comprising EBS wax are not stable on storage.

Test 15 (Comparative Defoamer Formulations not According to the Invention):

92.5 g of Shell Ondina 941 and 5 g of sorbitan monooleate are homogenized in a 350 ml PE beaker. Accompanied b shearing using a Dispermat CV (4 cm toothed disc) at 1000 rpm, 2.5 g of Blanova® Nylon-12 ($d_{50}$=6-9 μm) are added and dispersion takes place at 4000 rpm for three minutes.

Test 16 (Comparative Defoamer Fomulations not According to the Invention):

92.5 g of Shell Ondina 941 and 5 g of sorbitan monooleate are homogenized in a 350 ml PE beaker. Accompanied by shearing using a Dispermat CV (4 cm toothed disc) at 1000 rpm, 2.5 g of Kobo-Toray TR-1 (Nylon-6; $d_{50}$=13 μm) are added and dispersion takes place at 4000 rpm for three minutes.

The defoamer formulations from Tests 15 and 16 are investigated, in analogy to Tests 1-9, for their defoaming activity in an emulsion paint on Acronal 290 D.

Test system: emulsion paint based on Acronal 290 D
Formulation (in %):

| | | | |
|---|---|---|---|
| 1. | Water | 3.50 | |
| 2. | Calgon N 10% in water | 1.45 | BK Guilini Chemie Ladenburg, DE |
| 3. | Collacral VAL | 4.80 | BASF, Ludwigshafen, DE |
| 4. | Emulan OC 20% in water | 2.40 | BASF, Ludwigshafen, DE |
| 5. | Ammonia, 25% form | 1.00 | |
| 6. | Parmetol A 26 | 0.30 | Schülke & Mayr, Norderstedt, DE |
| 7. | Kronos 2059 | 24.00 | Kronos Titan, Leverkusen, DE |
| 8. | White spirit K30 | 0.25 | |
| 9. | Butyl glycol | 2.90 | |
| 10. | Acronal 290 D | 48.00 | BASF, Ludwigshafen, DE |
| 11. | Water | 11.40 | |
| | | 100% | |

Preparation Instructions:

Mix items 1-6, add item 7 with stirring and disperse for 20 min (dispersing 20 min 9.8 m/s=1865 rpm d=10 cm).

Mix items 8 and 9 and add with stirring. Add items 10 and 11 with stirring. Stir the whole for a further 15 min at 930 rpm.

Incorporation and Testing of the Defoamer:

50 g of emulsion paint are weighed out into a 175 ml PE beaker and 0.5% of the test defoamer is added.

Incorporation: dissolver, toothed disc d=4 cm, 2 min at 1865 rpm=4 m/s

The sample is stored at room temperature for 16-24 hours prior to application.

Thereafter 30 g of the sample are applied using an open-pored foam roller to a contrast chart (coated, No. 2801, BYK-Gardner, size approximately 28 cm×21 cm).

The foam roller (5.5 cm wide, d=8 cm, with handle, No. 3918730 from Friess) is washed out with water prior to each test, then wrung out and rolled dry as thoroughly as possible on a towel.

Evaluation:
0=complete defoaming
5=no defoaming activity
Results of Testing:

| | Description | Defoaming |
|---|---|---|
| Test 15 | Defoamer with added solid polyamide particles | 5 |
| Test 16 | Defoamer with added solid polyamide particles | 5 |

The defoamer formulations obtained by adding solid polyamide particles do not show defoaming activity. The result corresponds to one without defoamer.

The invention claimed is:

1. A method for preparing a formulation for defoaming aqueous media, comprising: dispersing a polyamide prepared from at least one diamine and at least one dicarboxylic acid in a liquid state, into a carrier medium selected from the group consisting of organic oils, mineral oils, siloxanes and organically modified siloxanes.

2. The method of claim 1, wherein the polyamide further comprises groups of at least one monoamine or at least one monocarboxylic acid, or mixtures thereof.

3. The method of claim 1, wherein the polyamide is taken up in an emulsifier.

4. The method of claim 1, wherein the diamine has a chain length of C4-C36.

5. The method of claim 1, wherein the diamine contains additional heteroatoms in the chain.

6. The method of claim 1, wherein the diamine is hexamethylenediamine, diaminododecane, or mixtures thereof.

7. The method claim 1 wherein the dicarboxylic acid has a chain length of at least C10.

8. The method of claim 1 wherein the dicarboxylic acid is a dimer fatty acid.

9. The method of claim 2 wherein the monocarboxylic acid has a chain length of C10-C40.

10. The method of claim 2 wherein the monocarboxylic acid is capric acid, lauric acid, myristic acid, palmitic acid, stearic acid, arachidic acid, behenic acid, lignoceric acid, cerotic acid, myristoleic acid, palmitoleic acid, oleic acid, elaidic acid, eicosenoic acid, erucic acid, ricinoleic acid, linoleic acid, linolenic acid, arachidonic acid, timnodonic acid, clupanodonic acid or mixtures thereof.

11. The method of claim 2 wherein the monoamine is a saturated or mono- or polyunsaturated primary or secondary amine having a chain length of C10-C40.

12. The method of claim 2, wherein the monoamine is a hydrogenated or unhydrogenated tallowamine, stearylamine, cocoamine, an alkylamine having a chain length of C16-C22, distearylamine, ditallowamine, dipalmitylamine, or mixtures thereof.

13. The method of claim 1, wherein the dicarboxylic acid is used in a molar ratio of 0.5 to 2 relative to the diamine.

14. The method of claim 2 wherein the molar ratio of dicarboxylic acid to monocarboxylic acid is 0.5-1.

15. The method of claim 14, wherein the molar ratio of diamine to monocarboxylic acid is 1-5.

16. The method of claim 2, wherein the molar ratio of diamine to monoamine is 0.5-4.

17. The method of claim 16, wherein the molar ratio of dicarboxylic acid to monoamine is 1-5.

18. The method of claim 1 wherein the weight-average molecular weight of the polyamide is between 1000 and 10 000.

19. A defoamer for aqueous media, comprising at least one polyamide prepared from at least one diamine and at least one dicarboxylic acid; and at least one monoamine, or at least one monocarboxylic acid, or mixtures thereof; in a liquid state, dispersed in a carrier medium selected from the group consisting of organic oils, mineral oils, siloxanes and organically modified siloxanes.

20. The defoamer of claim 19, wherein the diamine has a chain length of C4-C36.

21. The defoamer of claim 19 wherein the diamine contains further heteroatoms in the chain.

22. The defoamer of claim 19, wherein the diamine is hexamethylenediamine, diaminododecane, or mixtures thereof.

23. The defoamer of claim 19, wherein the dicarboxylic acid has a chain length of at least C10.

24. The defoamer of claim 19, wherein the dicarboxylic acid is a dimer fatty acid.

25. The defoamer of claim 19, wherein the monocarboxylic acid has a chain length of C10-C40.

26. The defoamer of claim 19, wherein the monocarboxylic acid is capric acid, lauric acid, myristic acid, palmitic acid, stearic acid, arachidic acid, behenic acid, lignoceric acid, cerotic acid, myristoleic acid, palmitoleic acid, oleic acid, elaidic acid, eicosenoic acid, erucic acid, ricinoleic acid, linoleic acid, linolenic acid, arachidonic acid, timnodonic acid, clupanodonic acid, or mixtures thereof.

27. The defoamer of claim 19, wherein the monoamine is a saturated or mono- or polyunsaturated primary or secondary amine having a chain length of C10-C40.

28. The defoamer of claim 19, wherein the monoamine is a hydrogenated or unhydrogenated tallowamine, stearylamine, cocoamine, an alkylamine having a chain length of C16-C22, distearylamine, ditallowamine, dipalmitylamine or mixtures thereof.

29. The defoamer of claim 19, wherein the dicarboxylic acid is used in a molar ratio of 0.5 to 2 relative to the diamine.

30. The defoamer of claim 19, wherein the molar ratio of dicarboxylic acid to monocarboxylic acid is 0.5-1.

31. The defoamer of claim 30, wherein the molar ratio of diamine to monocarboxylic acid is 1-5.

32. The defoamer of claim 19, wherein the molar ratio of diamine to monoamine is 0.5-4.

33. The defoamer of claim 32, wherein the molar ratio of dicarboxylic acid to monoamine is 1-5.

34. The defoamer of claim 19, wherein the polyamide has a weight-average molecular weight of between 1000 and 10 000.

35. Paints, printing inks, polymer dispersions, cooling lubricants, or papermaking formulations incorporating the defoamer of claim 19.

* * * * *